United States Patent [19]

Brashear

[11] Patent Number: 4,483,256

[45] Date of Patent: Nov. 20, 1984

[54] BIOMASS GASIFIER COMBUSTOR SYSTEM AND COMPONENTS THEREFOR

[75] Inventor: Robert S. Brashear, LaGrange, Ky.

[73] Assignee: Clayton & Lambert Manufacturing Co., Buckner, Ky.

[21] Appl. No.: 508,289

[22] Filed: Jun. 27, 1983

Related U.S. Application Data

[63] Continuation of Ser. No. 351,659, Feb. 24, 1982, abandoned.

[51] Int. Cl.$^3$ .......................... F23B 5/00; F23K 3/00
[52] U.S. Cl. .................................. 110/210; 110/214; 110/205; 110/190; 110/212; 110/225; 110/101 CF; 110/101 CD
[58] Field of Search ............... 110/210, 214, 203, 225, 110/101 CD, 101 CF, 190, 205

[56] References Cited

U.S. PATENT DOCUMENTS

| | | | |
|---|---|---|---|
| 1,511,279 | 10/1924 | Jackson | 110/101 CF |
| 1,970,383 | 8/1934 | Lauterbur et al. | 110/101 CD |
| 3,527,177 | 9/1970 | LaRue | 110/190 |
| 3,792,671 | 2/1974 | Woods | 110/212 |
| 3,861,334 | 1/1975 | Stockman | 110/205 |
| 4,242,972 | 1/1981 | Sicard | 110/205 |
| 4,316,420 | 2/1982 | Kochey | 110/190 |
| 4,331,086 | 5/1982 | Fitch et al. | 110/205 |
| 4,334,484 | 6/1982 | Payne et al. | 110/225 |

FOREIGN PATENT DOCUMENTS

157722 12/1981 Japan .................. 110/110

Primary Examiner—Henry C. Yuen
Attorney, Agent, or Firm—Maurice L. Miller, Jr.

[57] ABSTRACT

An improved biomass gasifier combustor system including a furnace, a screw feeder system for feeding a biomass fuel to the furnace and a venturi eductor system adapted for drawing a gaseous combustion product from a combustion chamber of the furnace is disclosed. The furnace enclosure forms a principal chamber in which a housing containing a secondary air chamber is disposed so as to form a partition in the principal chamber which divides the principal chamber into two regions, one of which regions is a gasification chamber and the other of which is a gas combustion chamber. A screw feeder including two separate augers connected to one another between the gasification chamber and a fuel storage source is also disclosed wherein the auger connected to the storage source is de-activated before the auger connected to the gasification chamber, whereby the latter auger empties itself of biomass fuel before de-activation such that a fire burning in the gasification chamber can not spread through the augers to the fuel storage source. An improved venturi eductor system and automatic control system for regulating the temperature in the combustion chamber and for diverting to ambient atmosphere a gaseous combustion product drawn from the combustion chamber into the eductor system when the temperature in the combustion chamber is below 1200° F. and when the temperature at a remote location is greater than a desired maximum value is also disclosed.

27 Claims, 15 Drawing Figures

BIOMASS GASIFIER COMBUSTOR SYSTEM AND COMPONENTS THEREFOR

CROSS REFERENCE TO RELATED APPLICATION

This application is a continuation of my previously filed co-pending application bearing the same title, Ser. No. 6/351,659, filed Feb. 24, 1982, now abandoned.

BACKGROUND OF THE INVENTION

1. Field of the Invention

This invention generally relates to improvements in furnaces known as biomass gasifier combustors in which biomass fuels are burned in an oxygen deficient atmosphere to produce a flammable gaseous combustion product which is thereafter mixed with air, ignited and fully burned to obtain a clean, stable, high temperature exhaust gas which is free of toxic impurities and which may, therefore, be used to dry grain directly or for other purposes where thermal energy is required.

2. Description of the Prior Art

One such furnace known in the prior art is that disclosed in a U.S. patent application entitled "Biomass Gasifier Combustor" filed by F. A. Payne and I. J. Ross on Jan. 18, 1980 and serially numbered 6/113,339, now U.S. Pat. No. 4,334,484. The subject prior art furnace consists of two separate and distinct chambers, namely, a gasification chamber and a gas combustion chamber, linked together by means of a gas exit pipe.

A suitable biomass fuel such as wood chips, corn cobs, peanut hulls or the like is introduced into the gasification chamber by means of a horizontally disposed auger or screw feeder and deposited on a grate. The fuel is ignited in any suitable manner as by means of a rolled paper wick, propane hand torch or the like in a reducing atmosphere which is substantially deficient in oxygen so that said fuel burns only in a limited combustion region on or near the grate to yield a hot, flammable gaseous combustion product known in the trade as producer gas which is thereafter drawn off of an upper portion of the gasification chamber.

A venturi fan and eductor system is employed to draw a sufficient quantity of ambient air into the base of the gasification chamber to permit burning of the fuel on and near the grate and to draw the resulting producer gas out of the upper end of the gasification chamber, through the gas exit pipe and into one end of the combustion chamber. The hot producer gas entering the combustion chamber is mixed with additional ambient air, ignited and fully and completely burned while flowing across the combustion chamber under the influence of the venturi fan to yield a stable high temperature exhaust gas consisting of $CO_2$, $N_2$ and water vapor. The resulting exhaust gas is free of particulate matter, tar and other corrosive and toxic impurities and may, therefore, be drawn out of the combustion chamber and used to dry grain by direct passage therethrough rather than being isolated from the grain by means of an inefficient heat exchanger system. The combustion chamber contains a barrier wall therein which forces the ignited mixture of ambient air and producer gas to follow a circuitous path to assure that all of the flammable products will be completely burned by the time a given quantity of the gas has reached the exit port preparatory to entering the eductor system. In this manner, only non-flammable, clean, stable, high temperature gas will be drawn from the combustion chamber.

One difficulty encountered using the subject prior art furnace is the rapid build-up of tar in and along the exit pipe adjoining the two chambers through which the unburned producer gas must flow. Such a tar build-up occurs because particulate matter contained in the producer gas tends to condense or precipitate out of the gaseous mass as the latter cools during its transition through the exit pipe. As a result, the furnace must be shut down frequently so that the gas exit pipe may be cleaned as failure to clean the pipe can lead to total blockage thereof to the flow of gas.

Another difficulty that has been encountered using the subject furnace is its inability to accurately and automatically control the mixture ratio of producer gas and ambient air in the combustion chamber in order to accurately regulate the exit temperature of the exhaust gas and to assure that the exhaust gas does not contain unburned, toxic substances.

Yet another problem that has been encountered using the subject furnace is the dangerous possibility that a fire occurring in the biomass fuel disposed in the combustion chamber may spread through fuel contained in the auger or screw feeder out of the furnace toward and even into the fuel storage means.

Also, it has been found that when used in grain drying operations, the eductor system of the furnace may emit exhaust gas from the combustion chamber which is far too hot to dry grain directly without cooking, cracking and otherwise seriously damaging the kernels.

By means of the present invention, these and other difficulties previously encountered using prior art biomass gasifier combustors have been substantially eliminated.

SUMMARY OF THE INVENTION

It is an object of the present invention to provide an improved biomass gasifier combustor system.

It is another object of the present invention to provide an automatic control system for a biomass gasifier combustor system.

It is still another object of the present invention to provide screw feeder means for a biomass gasifier combustor system which prohibits a fire burning in a gasification chamber of a biomass gasifier combustor system from spreading out of the gasification chamber, through the screw feeder means and into a biomass fuel storage source.

It is yet another object of the present invention to provide an improved fire grate for a biomass gasifier combustor system.

It is also an object of the present invention to provide means for diverting a gaseous combustion product drawn out of a combustion chamber of a biomass gasifier combustor to ambient atmosphere from a remote location where such product is intended to be used as a heating and drying medium when the temperature of said remote location is above a preselected maximum value or when the temperature in the combustion chamber is less than a preselected minimum operating temperature.

It is also an object of the present invention to provide an improved biomass gasifier combustor system having a furnace assembly defining a principal hollow chamber therein and a housing defining a secondary air chamber therein disposed in the principal chamber to form a partition between two regions of the principal chamber, which regions define gasification and combustion chambers wherein the latter chambers communicate with one another through a first port located between the secondary air chamber and a defining surface of the principal chamber, the housing further defining a second port therein which communicates between the secondary air chamber and the combustion chamber, and means for introducing ambient air into the secondary chamber.

It is yet another object of the present invention to provide an improved suction means in the form of a venturi eductor system adapted to communicate with a combustion chamber of a biomass gasifier combustor system for drawing a gaseous combustion product out of the combustion chamber and directing it toward a remote location for use as a heating and drying medium and for drawing a volatile producer gas formed in a gasification chamber of the biomass gasifier combustor into the combustion chamber.

It is an object of the present invention to provide means for controlling and regulating the temperature in a combustion chamber of a biomass gasifier combustor system.

These and other objects of the present invention will become apparent to those skilled in the art from the following description and drawings upon which by way of example, only the preferred embodiments of my invention are illustrated.

DESCRIPTION OF THE PREFERRED EMBODIMENT

Figure 1:
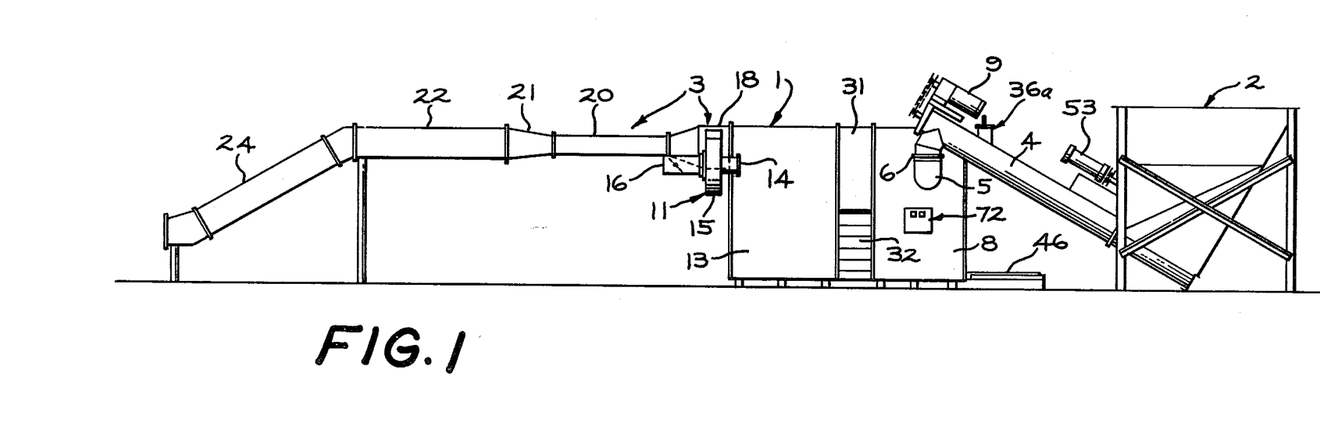
FIG. 1 shows a side elevation view of an improved biomass gasifier combustor system including a furnace, fuel hopper, screw feeder means and a suction means or venturi eductor system, thus illustrating one preferred embodiment of my invention.
Figure 2:
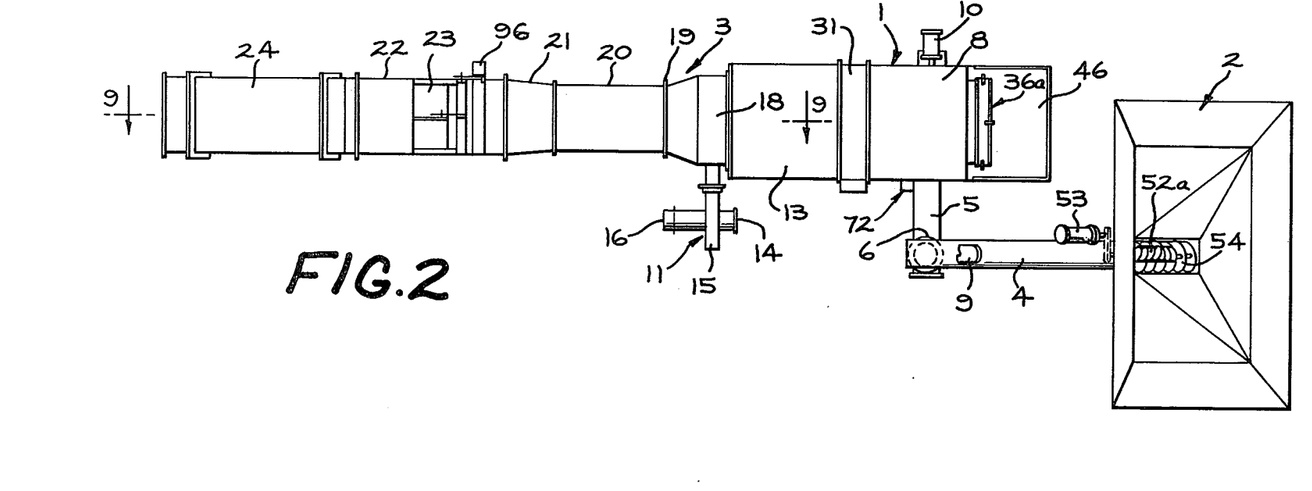
FIG. 2 shows a top plan view of the biomass gasifier combustor and associated components of FIG. 1.
Figure 3:
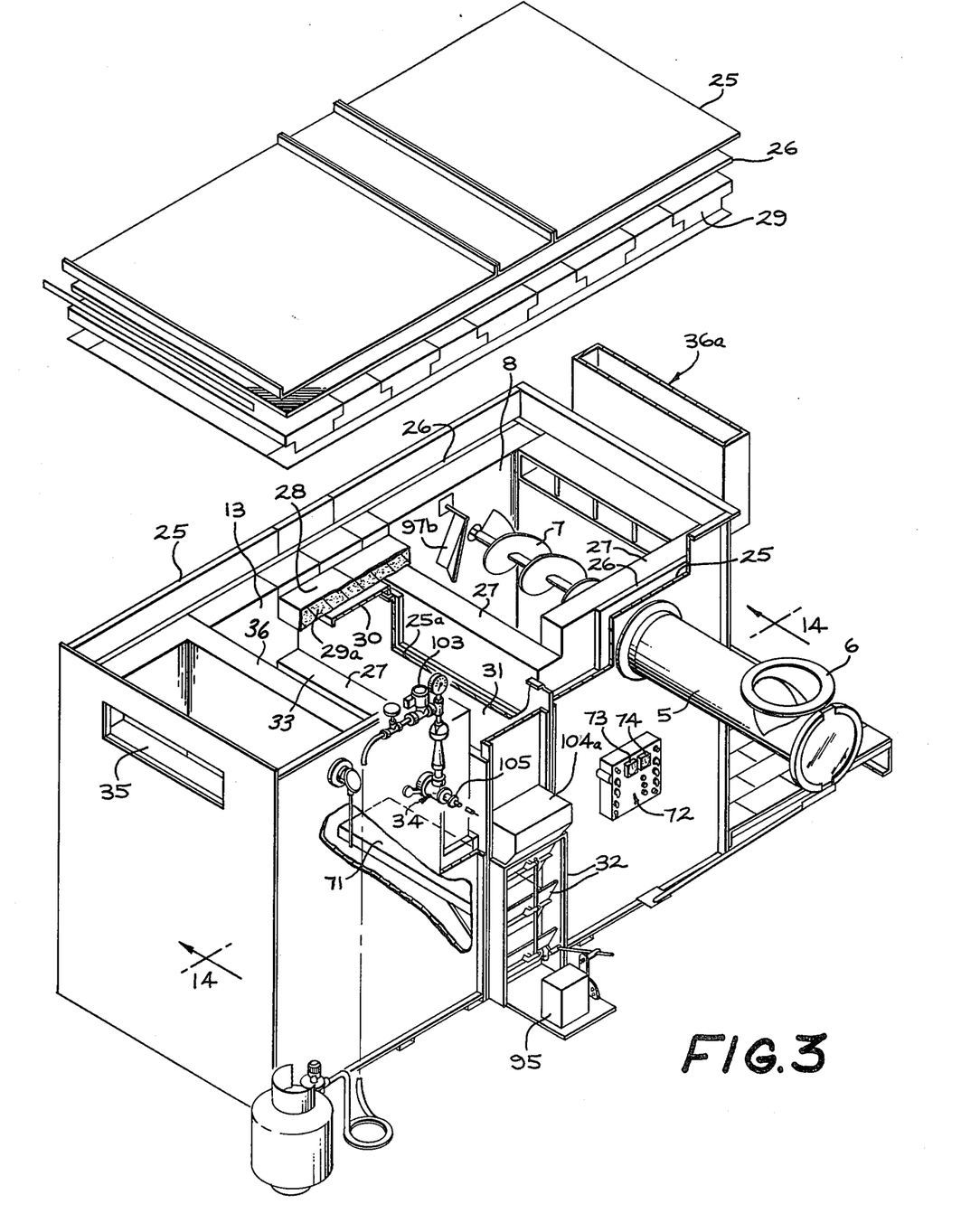
FIG. 3 shows an oblique projection of the furnace portion of the assembly of FIGS. 1-2 with roof exploded thereabove to expose the interior.
Figure 4:
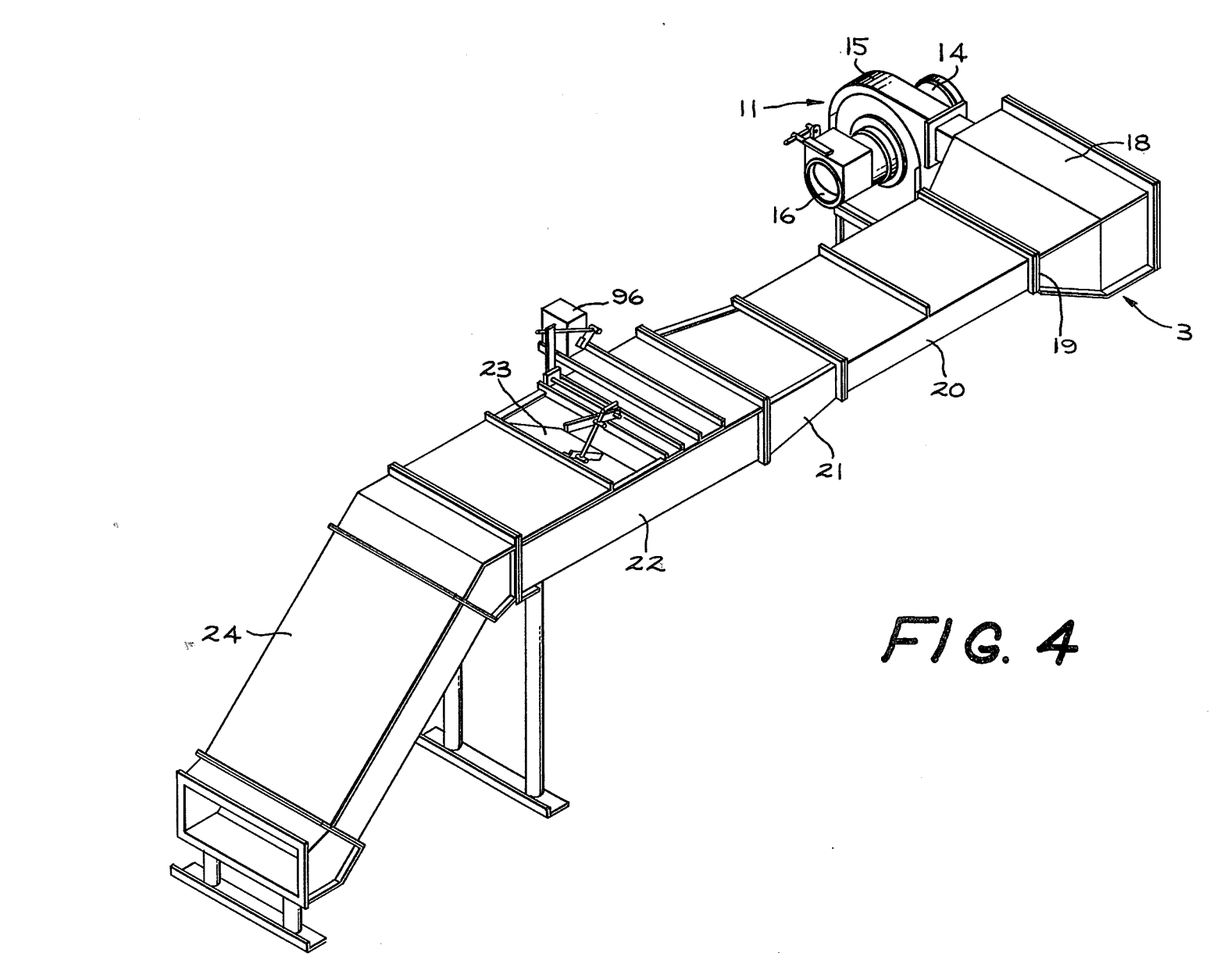
FIG. 4 shows an oblique projection of the venturi eductor system of FIGS. 1-2.

Referring now to the drawings and specifically FIGS. 1-2, there is shown, in one preferred embodiment of my invention, a biomass gasifier combustor system which includes a furnace 1, a biomass fuel storage hopper 2 and a venturi eductor assembly 3. Referring also to FIGS. 3 and 8, it will be observed that the base of the hopper 2 is connected to the furnace 1 by a screw feeder means including an inclined auger tube assembly 4 and a horizontal auger tube assembly 5. The auger tube assemblies 4, 5 are joined together at a flanged opening 6 wherein biomass fuel is fed from an upper end portion of the tube assembly 4 into one end of the tube assembly 5. A screw feeder 7 projects out of the other end of the tube assembly 5, through a furnace wall and into and across a gasification chamber 8 of the furnace 1. The inclined auger tube assembly 4 contains a screw feeder which is operated by an inclined auger drive motor 9 while the horizontal auger 7 is operated by a horizontal auger drive motor 10 (See FIGS. 2 and 5). Ambient air is drawn by means of a venturi fan 11 into a base portion of the gasification chamber 8 under and around a grate structure 12 (See FIGS. 7 and 14) in a quantity sufficient to permit combustion of the biomass fuel on and near the grate structure 12 and sufficient to allow producer gas to be drawn off an upper end portion of the chamber 8 and into a combustion chamber 13.

Referring to FIGS. 1-2, 4 and 9-11, the venturi eductor system 3 of the present example includes a fan motor 14, a pressure blower assembly 15 with adjustable damper 16, an air passage means 16a, a suction duct 17 and a plenum section 18. The eductor assembly 3 also includes a nozzle or jet as at 19, a throat member 20, a diverging expansion member 21 and a discharge section 22. The discharge section 22 includes a discharge gas vent door 23 which may be opened so as to divert any desired portion of gas flowing into the discharge section 22 to ambient atmosphere as later more fully explained. An inclined section 24 may be connected to the downstream end of the discharge section 22 when needed as, for example, when it is desired to deliver an exhaust gas from the furnace 1 to a remote location such as the base of a grain bin for grain drying purposes.

Figure 14:
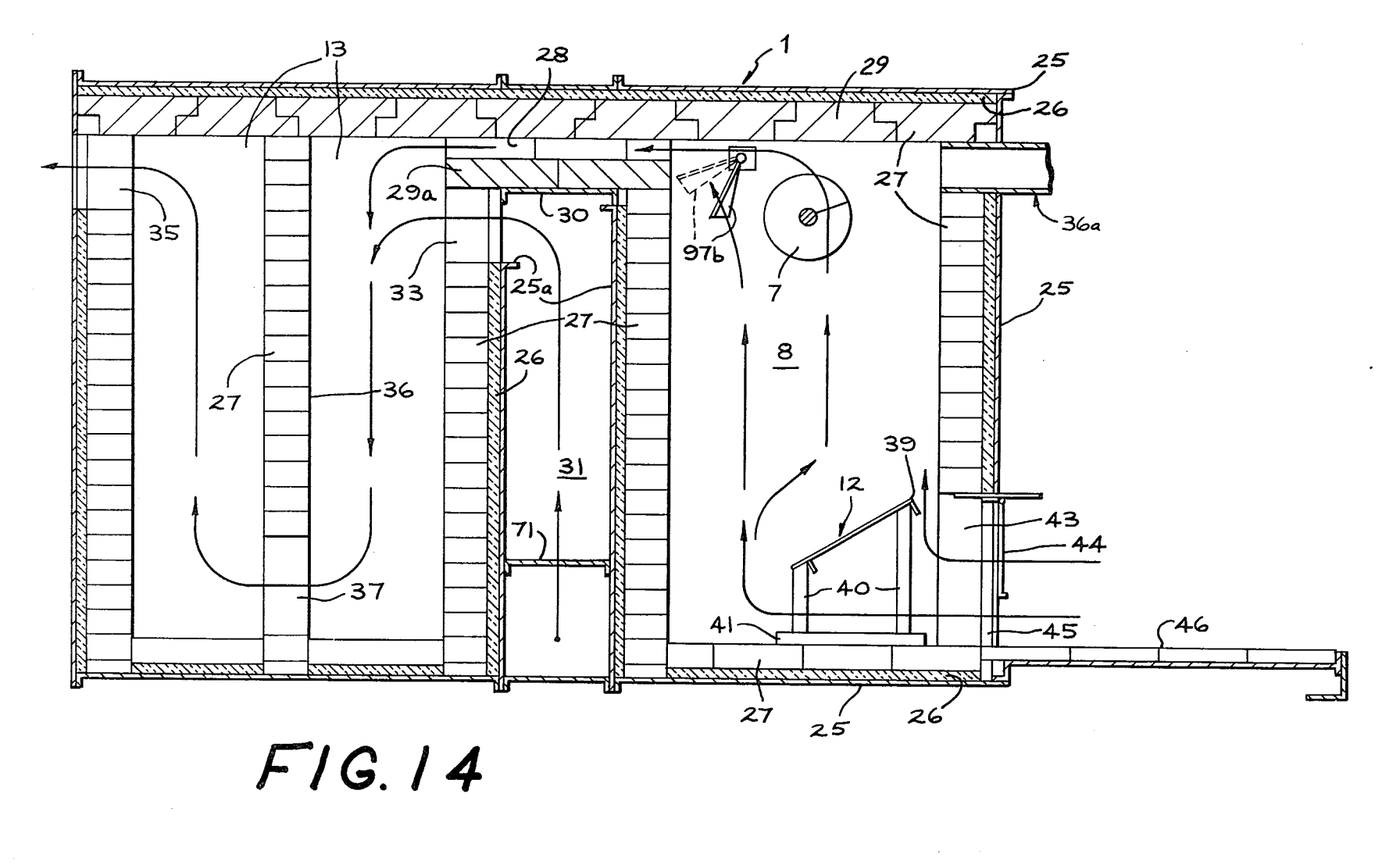
FIG. 14 shows a cross-sectional side elevation view of the furnace portion of the biomass gasifier combustor system of FIGS. 1-3 and 5 as viewed along cross-sectional lines 14—14 of FIG. 3 and utilizing the alternative grate structure of FIG. 7.

Referring now specifically to FIGS. 3 and 14, it will be noted that the furnace 1 includes a housing 25 which may be constructed of a suitable sheet steel such as, for example, 12 gauge sheet steel. Next to the sheet steel of the housing 25 is a sheet 26 of thermal insulating material such as, for example, one inch thick mineral board as manufactured by A. P. Green Refractories Company of Mexico, Mo. Walls 27 of suitable fire brick, preferably having a temperature rating of 3000° F., such as, for example, that sold under the trademark "Empire" as manufactured by the aforementioned A. P. Green Refractories Company, are laid next to the sheet 26 so as to form the door and exposed interior walls of the furnace 1. A layer 29 of castable refractory forms a roof of the furnace 1 and defines an upper surface of a port 28. A layer 29a of castable refractory which forms the lower defining surface of the port 28 is laid upon a steel channel support member 30 which extends across the interior of the furnace 1. The port 28 communicating between the chambers 8 and 13 thus lies between the secondary air chamber 31 and the ceiling of the principal furnace chamber.

The support member 30 defines an upper surface of a secondary air chamber 31 which also extends across the interior of the furnace 1 into which ambient air is drawn by operation of the venturi eductor system 3 through a series of adjustable panels 32 (FIG. 3 only). The ambient air thus drawn into the chamber 31 flows upwardly through a port 33 extending across an upper end portion of the chamber 31 and thence into an upper end portion of the chamber 13 wherein it is mixed with producer gas flowing into the chamber 13 from the port 28 above. A propane gas jet 34 mounted on a sidewall of the furnace 1 (See FIG. 3) communicates with the air mixing zone in the combustion chamber 13 and is used to ignite the resulting mixture of ambient air and producer gas upon command when the furnace 1 is initially placed in operation. Once ignited and provided the temperature of the burning mixture remains at a preselected minimum temperature of at least 1200° F. or above, the producer gas will continue to burn spontaneously as it enters the mixing zone of the combustion chamber 13 from the gasification chamber 8 through the port 28. The castable refractory layer 29 and adjoining support member 30, the steel sidewalls 25a and adjoining walls of fire brick 27, and a portion of the fire brick 27 forming opposite interior walls of the furnace 1 thus form a housing for the secondary air chamber 31 which is disposed within a larger, principal hollow chamber defined by the brick sidewalls 27 lining the furnace 1. The secondary air chamber housing thus formed provides a partition between two regions of the principal chamber of the furnace 1, which regions define the gasification and combustion chambers 8 and 13, respectively.

To assure that all flammable components of the producer gas are fully burned within the secondary combustion chamber 13 before the gas reaches an exhaust port 35 and enters the eductor system 3, the chamber 13 is divided into two sections by a partition wall 36 having an opening 37 located at the bottom of the wall 36 such that the burning producer gas flows through an elongated and circuitous path between the ports 28 and 35. The elongated gas flow path thus formed, increases the residence time of any given portion of the producer gas flowing through the chamber 13 to assure complete combustion of all flammable parts thereof. I have found that the flow path should be at least sufficient to assure a minimum residence time of any given portion of burning producer gas in the chamber 13 of at least 0.4 seconds. In addition, I have found it preferable to maintain the temperature in the combustion chamber 13 near the exhaust port 35 at about 1650° F. to further assure complete conversion of the toxic substances in the producer gas into stable high temperature exhaust gas.

In the event of an emergency, such as failure of the venturi fan motor 14, or for any other reason that might cause an abnormally high accumulation of producer gas in the gasification chamber 8, an emergency vent assembly 36a is provided to vent producer gas directly to ambient atmosphere from an upper end portion of the chamber 8. As shown best in FIG. 5, a series of hand-operatable latches 37 may be thrown to open a hingably movable door 38 to vent producer gas upwardly above the furnace 1. It is important for safety purposes to vent such a gas accumulation to the ambient atmosphere from a high level of the chamber 8 above the furnace 1 since such gas is flammable and may, if sufficiently high in temperature, spontaneously combust when the door 38 is opened thus throwing a heavy flame upwardly out of the vent assembly 36a.

Figure 7:
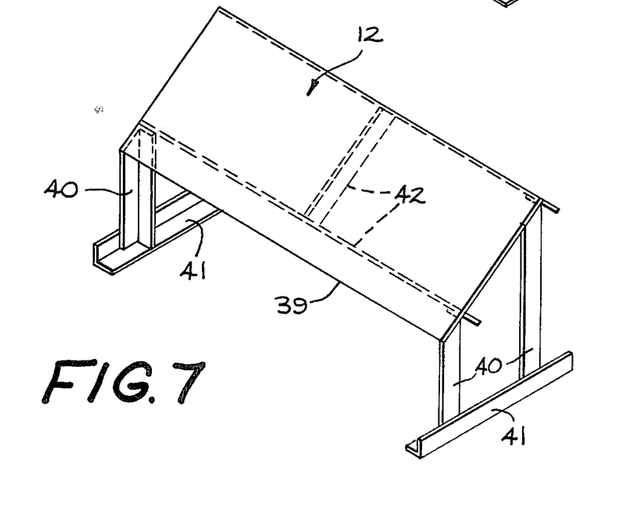
FIG. 7 shows an oblique projection of an alternative firegrate structure which may be used in the biomass gasifier combustor of FIGS. 1-2.
Figure 8:
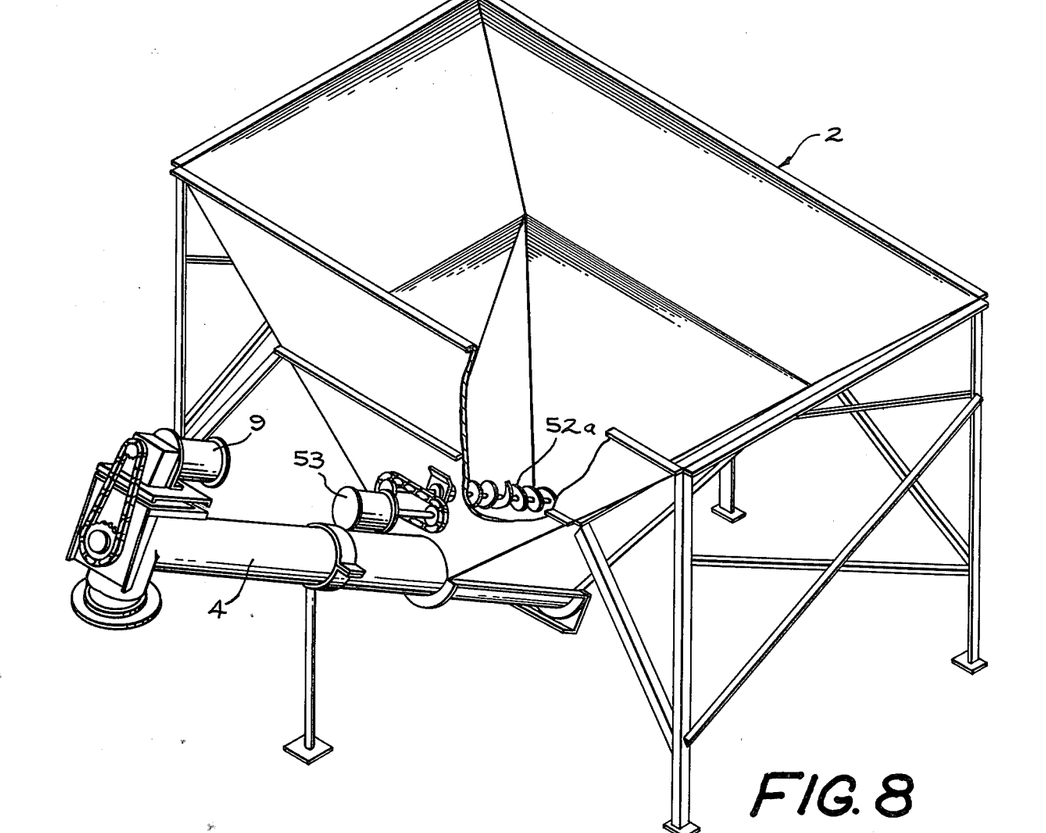
FIG. 8 shows an oblique projection of the fuel hopper and screw feeder means of FIGS. 1-2.

The grate 12 of the present example as shown in FIGS. 7 and 14 may be constructed of a suitably high temperature steel, stainless steel or the like and includes a rectangular plate 39 inclined as shown, as, for example, at a 45 degree angle with the floor of the gasification chamber 8, and mounted on steel angle iron standards or legs 40. The legs 40 are welded on their upper ends to the plate 39 and on their lower ends to angle iron runners 41. The plate 39 may be reinforced in any suitable manner as by means of steel ribs, for example, as shown only in FIG. 7 by hidden or dashed lines 42. An access opening 43 is provided in the furnace 1 which permits access to the base of the chamber 8 to permit insertion of the grate member 12 therein and to permit cleaning of ash from the chamber floor. A door 44 is hingably attached to the housing 25 and adapted to partially cover the access opening during periods when the furnace 1 is in operation. A gap 45 between a lower edge of the door 44, when closed, and a hearth floor 46 permits ambient air to be drawn into the chamber 8 by action of the eductor system 3 sufficient for combustion of the biomass fuel in a lower end portion of the chamber 8 and sufficient to permit the resulting producer gas to be drawn off the top of the chamber 8 into the combustion chamber 13.

Figure 5:
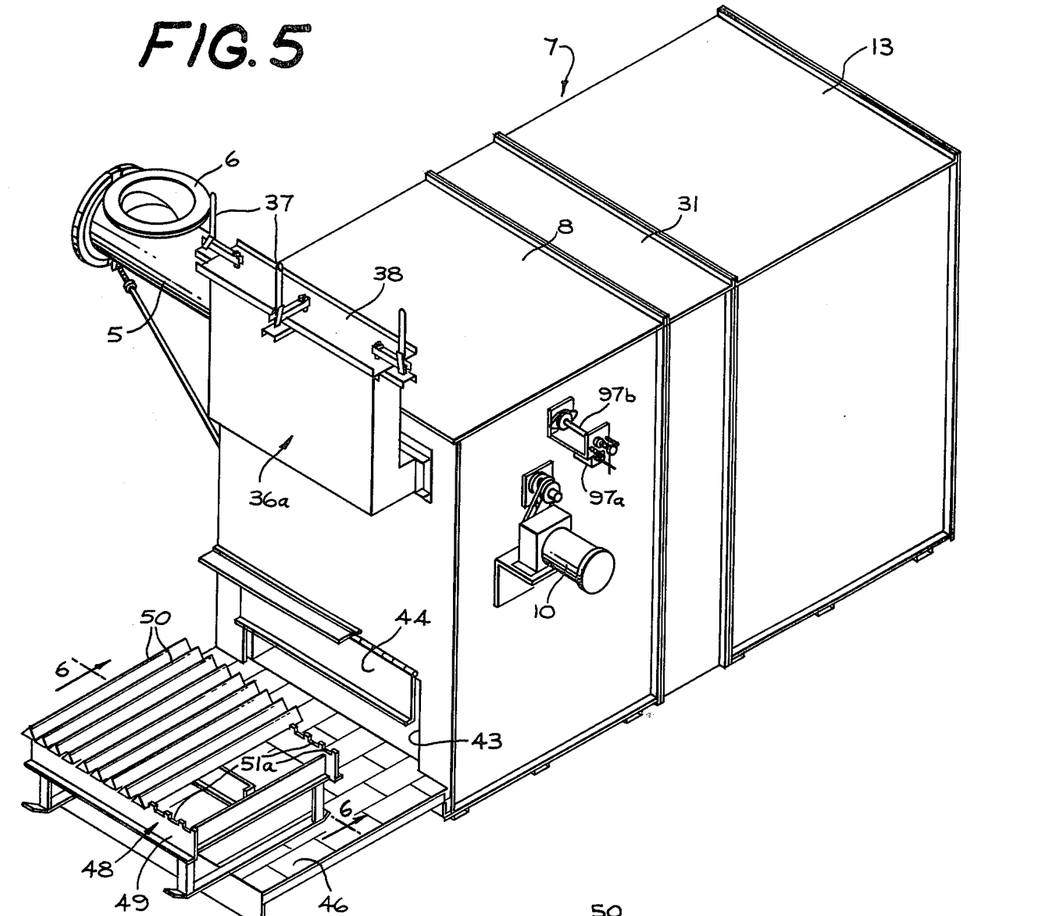
FIG. 5 shows an oblique projection of the furnace portion of FIGS. 1-2 as viewed from the side opposite that shown in FIG. 3 and showing a firegrate structure adapted for disposition in the furnace.
Figure 6:
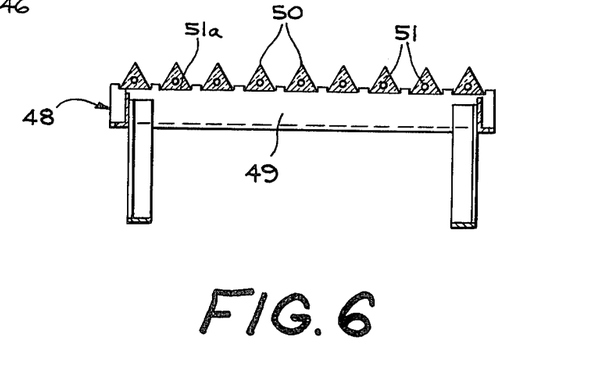
FIG. 6 shows an end elevation view of the firegrate structure of FIG. 5.

An alternative firegrate assembly 48 for use in the gasification chamber 8 is shown in FIGS. 5-6 which includes a rectangularly shaped steel supporting frame 49 upon which rests a series of elongated grate bars or cross-members 50 having triangular cross-section. The grate bars 50 consist of a suitable high temperature resistant refractory material molded about elongated steel reinforcing rods 51. The refractory material forming each of the grate members 50 is constructed of Babcock and Wilcox Kaocreate 28-L1 castable refractory, which is formed by mixing dry castable refractory powder with water and stainless steel shavings. The resultant mixture is poured into a suitable mold containing a stainless steel reinforcing rod, ¼ inch in diameter, which rod is coated with oil to prevent the refractory material from bonding thereto. The mold is then leveled and vibrated, after which it is allowed to stand for about 24 hours until the mixture is set. Thereafter, the grate member is removed from the mold and cured in an oven wherein the temperature is varied from 100° F. up to about 2000° F. gradually over a period of about 24 hours, after which the member is ready for use. The members 50 rest upon the support frame 49 in a series of spaced slots 51a so that there exists a space, preferably of about ½ inch, between the lower edge of adjacent ones thereof.

It has been found that certain biomass fuel material such as corn cobs contain minute quantities of silicon and other substances which, when burned at extremely high temperatures of about 2000° F., produce a glassy viscous slag as the material cools. The cross-sectional geometry of adjacent members 50 allows the burning cobs and embers to lie therebetween such that the temperature of the members 50 is about as high near the base of the members 50 as at the top thereof so that any slag formed as the cobs burn will maintain sufficiently low viscosity to flow down the sides of the members 50 and drop upon the ashes and cinders on the floor below rather than cool and solidify while still on the members 50. Thus only a small quantity of such slag solidifies along the sloping sides of the members 50 as the members 50 cool after shutdown of the furnace 1. Such residual solidified slag will thereafter melt and run off the members 50 when the furnace 1 is restarted during its next period of use. Because of the triangular cross-section of the members 50, slag will not build up and solidify in the spaces between adjacent members 50. Slag buildup forming a blockage across and between adjacent grate members has been a serious problem using some prior art grates in furnaces of this type.

Referring again to FIGS. 7 and 14, the alternative grate assembly 12 shown therein permits slag build-up caused by cobs burning at or near the surface of the plate 39 to run downwardly and drip upon the ashes on the floor below. Upon shutdown of the furnace 1 after use, a small slag residue may solidify upon the plate 39 as the latter cools but such residue will be melted so as to run off to the floor during the next successive use of the furnace 1. Thus, slag residue will not accumulate upon the plate 39 from one cycle of furnace operation and shutdown to the next.

A problem that has also been observed using the fuel hopper 2 of the present example is that corn cobs, in particular, when used as biomass fuel, tend to bridge over the exposed screw feeder 54 projecting downwardly out of the screw feeder tube 4 into the base of the hopper container (See FIG. 2). Under such circumstances of bridging, the auger or screw feeder 54 can not engage the cobs to transport them upwardly through the tube 4 for delivery to the chamber 8. To eliminate such bridging which occurs from time to time, an anti-bridging means such as a second auger 52a driven by a suitable motor 53 is employed. The anti-bridging auger 52a is inclined into the hopper 2 parallel to and above a screw feeder 54. The screw feeder 54 projects out of the lower end of the tube 4 (See FIG. 2).

Figures 9, 10, 11:
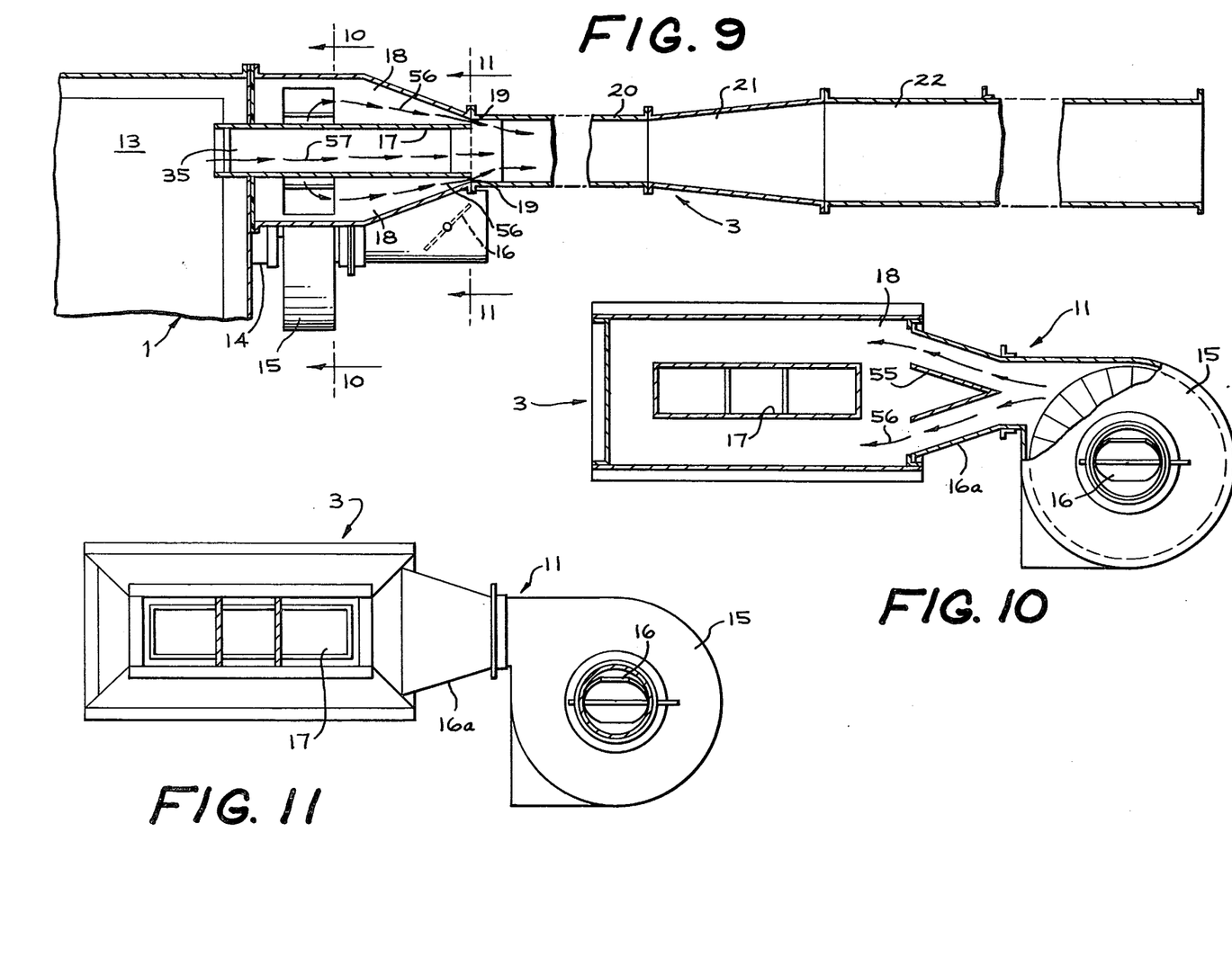
FIG. 9 shows a cross-sectional side elevation view of the venturi eductor system of FIGS. 1-2 as viewed along cross-sectional lines 9—9 of FIG. 2.
FIG. 10 shows a cross-sectional elevation view of the eductor system of FIGS. 1-2 and 9 as viewed along cross-sectional lines 10—10 of the latter figure.
FIG. 11 shows a cross-sectional elevation view of the eductor system of FIGS. 1-2 and 9 as viewed along cross-sectional lines 11—11 of the latter figure.
Figure 12:
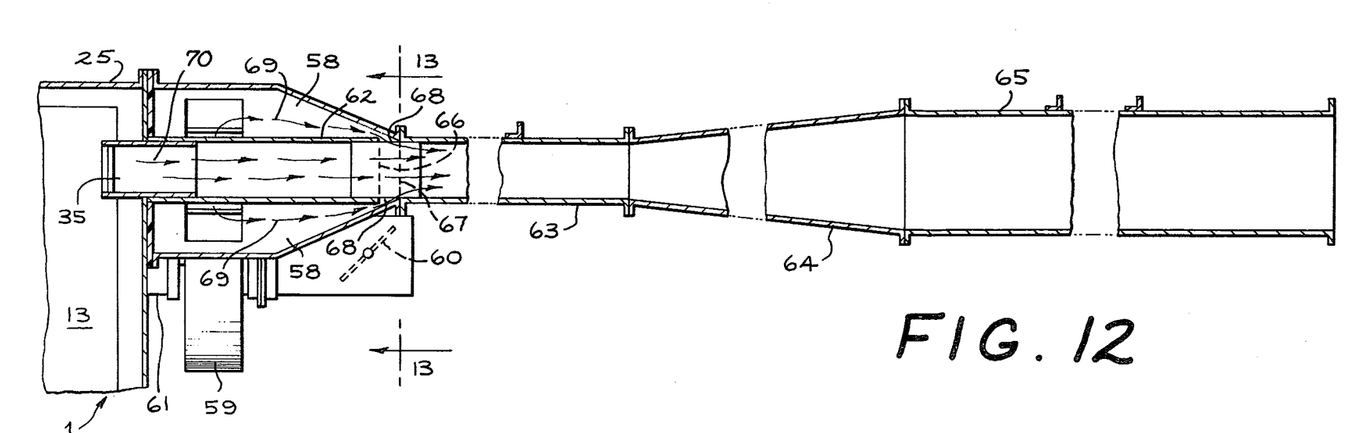
FIG. 12 shows a cross-sectional side elevation view of an alternative, high efficiency eductor system which may be used with the biomass gasifier combustor of the present invention.
Figure 13:
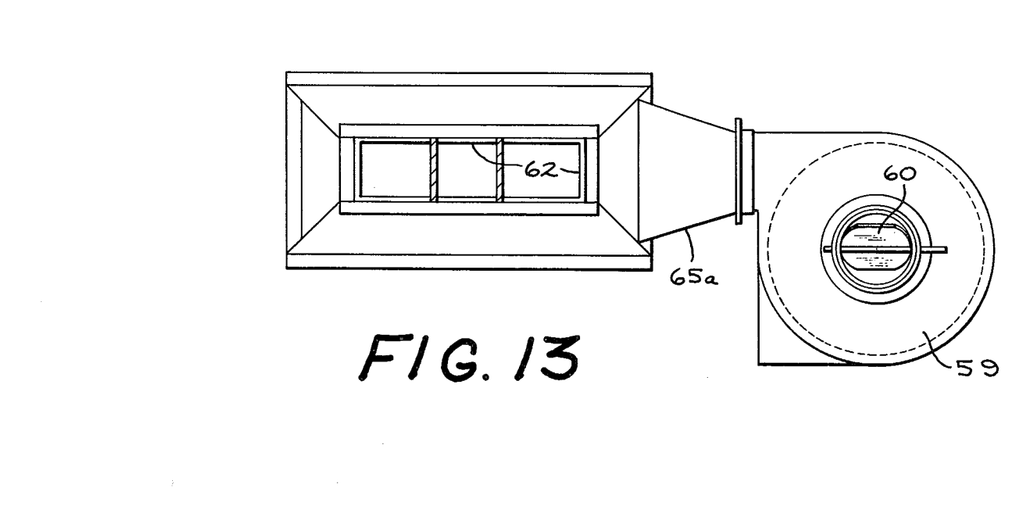
FIG. 13 shows a cross-sectional elevation view of the alternative eductor system of FIG. 12 as viewed along cross-sectional lines 13—13 of the latter figure.

Referring again to the construction of the venturi eductor system 3 as shown in FIGS. 1-2, 4 and 9-11, the blower 15 draws ambient air through the damper 16 and directs it toward the vertex of an elongated V-shaped air divider panel or baffle 55 which extends across an air passage 16a and opens toward the suction duct 17. Such ambient air flow is then split by the baffle 55 to flow in more or less equal quantities upwardly and downwardly in the plenum chamber 18 around the duct 17, from whence it flows forwardly toward and through the jet 19 and into the throat section 20. The flow of fan air as previously explained is shown in FIGS. 9-10 by arrows designated 56. As the fan air 56 passes through the jet 19 at the downstream end of the suction duct 17, it produces a suction or venturi effect upon the downstream open end of the duct 17 to draw producer gas and ambient air through the furnace 1 as previously explained and to draw clean high temperature exhaust gas 57 out of the chamber 13 of the furnace 1. The fan air 56 and exhaust gas 57 combine with one another in a mixing zone located in throat section 20 and thereafter flow to the right as viewed in FIG. 9 and ultimately out of the discharge section 22. I have used this form of eductor system 3 to reduce the temperature of the exhaust gas 57 as measured in the chamber 13 near the exhaust port 35 from about 1650° F. to a temperature of about 600°-700° F. at the downstream end of the discharge section 22 depending upon the setting of the damper 16 of venturi fan 15. I find gas discharge temperatures in this range to be about optimum for the exhaust gas-fan air combination for use in drying grain in a grain bin by passing the same through the inclined section 24 (See FIGS. 1-2). The damper 16 may be adjusted so as to control the amount of fan air 56 generated by fan 15 and introduced into the plenum 18. The amount of exhaust gas 57 drawn through the duct 17 per unit of time is a function of the amount of fan air 56 generated by the fan 15 per unit time. Accordingly, the BTU output of the eductor system 3 may be controlled by adjustment of the damper 16.

Where the combustor system of the present example is used in applications other than grain drying wherein a gaseous heating medium having a temperature in excess of 700° F. is required, I employ an alternative embodiment of the eductor system 3 as shown in FIGS. 12-13 which can produce exhaust gas temperatures of from 1400°-1500° F. In FIGS. 12-13, there is shown a plenum section 58, blower 59, damper 60, fan motor 61, suction duct 62, throat section 63, diverging expansion section 64, discharge section 65, and air passage 65a, the latter four sections being similar to the corresponding elements of the eductor 3 of FIGS. 9-11. The upstream end of the suction duct 62 is connected to the exhaust port 35 of the furnace 1 of the previous example. However, unlike the previous example of eductor system 3, here the downstream end 66 of the duct 62 terminates upstream of, but in line with, the downstream end of the plenum chamber 58 at the entrance 67 to the throat section 63. A gap 68 is thus formed between the downstream end of the suction duct 62 and the entrance 67 which follows the rectangular shape of the downstream end of the suction duct 62 and allows fan air 69 to flow from the plenum 58, through the gap 68 and into the entrance 67 to mix with a hot exhaust gas 70 flowing out of the downstream end of the duct 62 at a much sharper angle than was the case in the previous example of FIG. 9. Where the exhaust gas 70 has a temperature of 1650° F. in the chamber 13 at the entrance to the exhaust port 35, I have obtained exhaust gas fan air mixture temperatures as high as 1500° F. at the downstream end of the discharge section 65. Such gas temperatures are, of course, far too high for drying grain directly in grain bins but are desirable in numerous other industrial and commercial applications.

Referring again to FIGS. 3 and 14, there is shown an elongated flat plate 71 connected at one end thereof to one interior end wall of the secondary air chamber 31 immediately in front of the air inlet panels 32 which forms an air divided shelf in the chamber 31. The plate 71 is cantilevered from its connected end into and along approximately one-half the length of the chamber 31 and is located above and parallel to the floor of the chamber 31 a distance sufficient to cause air entering the chamber 31 through the panels 32 to divide and flow in approximately equal proportions above and below the plate 71. Thus, while one portion of ambient air drawn through the panels 32 into the chamber 31 above the plate 71 will tend to be drawn immediately upward through the port 33 and into the combustion chamber 13 directly above the plate 71, the other portion drawn through the panels 32 into the chamber 31 below the plate 71 must flow across one-half of the chamber length and beyond the free end of the plate 71 before being drawn upwardly through the chamber 31. The plate 71, therefore, improves the distribution of ambient air being drawn into the chamber 13 along the length of the port 33.

Figure 15:
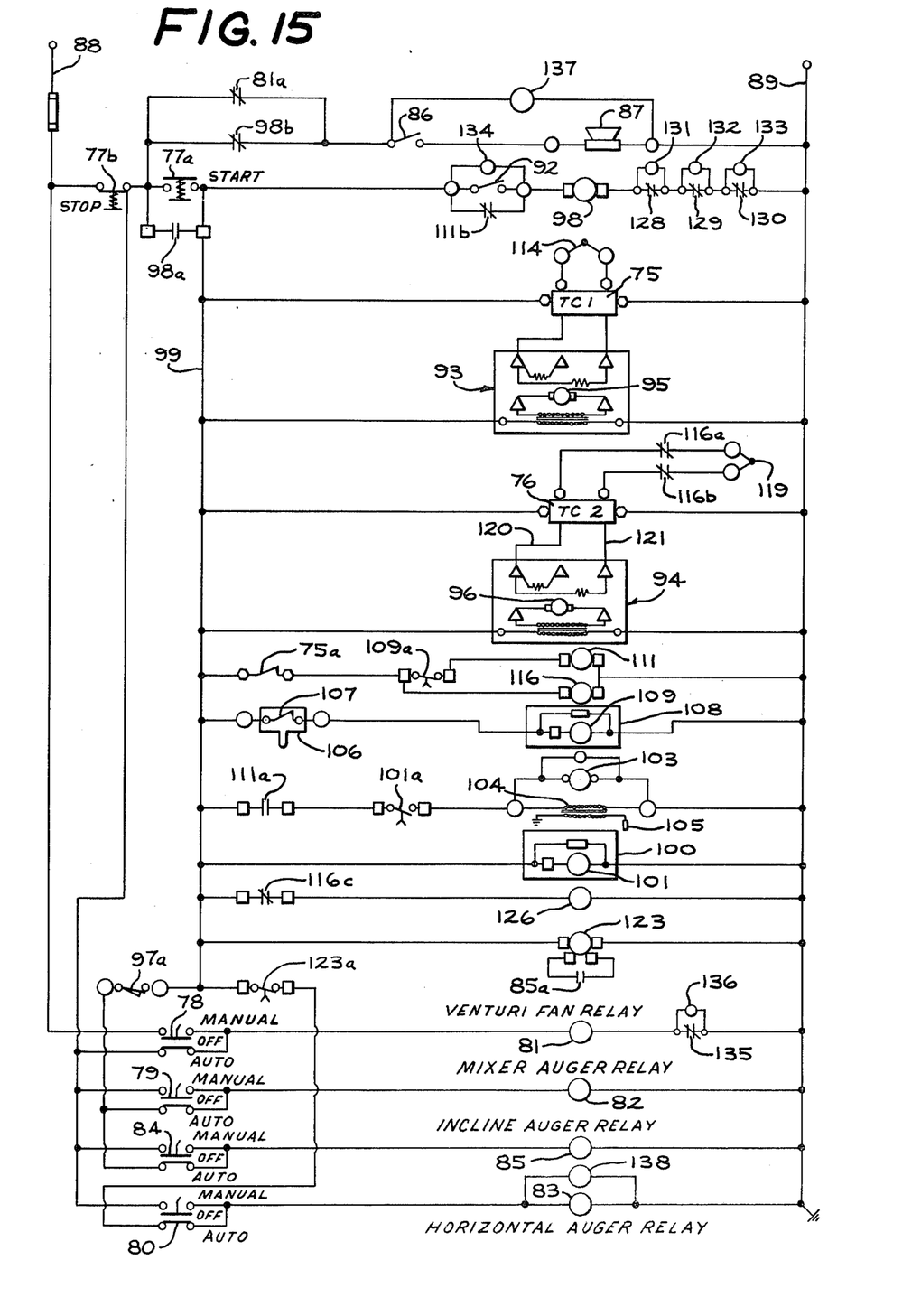
FIG. 15 shows a circuit diagram for an electrical control system of the biomass gasifier combustor system of FIGS. 1-3.

Referring also to FIG. 15, an electrical control system for operation of the biomass gasifier combustor system of FIGS. 1–4 will now be explained. The control system is manually accessed at a suitable control panel 72 which may be conveniently located on a side of the housing 25 as shown in FIGS. 1–3. The control panel 72 includes dials 73, 74 for reading and manually adjusting two conventional temperature controllers shown in FIG. 15 and designated 75, 76, respectively. The panel 72 also includes, in any suitable array, a series of switches as shown in FIG. 15. These switches include a main start switch 77a, a main stop switch 77b and a series of 3-position switches 78, 79 and 80 having off, manual and automatic positions for operation of relays 81, 82 and 83, respectively, which in turn, operate the venturi fan motor 14, the mixer auger motor 53, and the horizontal auger motor 10, respectively. A switch 84 accessible from the panel 72 is a 3-position switch having off, manual and automatic positions for operation of a relay 85 which, in turn, controls operation of the incline auger motor 9. The switch 84 may be placed in a stable off or automatic position and may be temporarily placed in the manual position by overcoming a spring bias which, when released, will return the switch 84 to the off position. Also included on the panel 72 is SPST bypass switch 86 which when closed places a warning horn or alarm 87 across a 120 volt control potential applied to a pair of bus lines 88, 89 provided either a relay switch 81a or 98b is closed and provided the stop switch 77b is in a normally closed position as shown. Lastly, the panel 72 contains a SPST manual override switch 92, the function of which will later be more fully explained. Also included in the circuit of FIG. 15 is a damper modulating motor circuit 93 which operates a modulating motor 95 (See also FIG. 3) which, in turn, controls the adjustment of panels 32 to adjust the volume of ambient air introduced into the secondary air chamber 31, and a damper modulating motor circuit 94 which operates a modulating motor 96 (See also FIG. 4) which, in turn, controls adjustment of the discharge gas vent door 23 in the eductor system 3. A normally closed, 2-position, spring return biomass fuel level switch 97a having an actuating lever 97b located in an upper end portion of the gasification chamber 8 also controls the circuit of FIG. 15.

The circuit of FIG. 15 operates as follows. First, the switches 78–80 and 84 are placed in their normally employed automatic positions and the manual override switch 92 is closed. Next, the start switch 77a is moved against its spring bias to its closed position to momentarily apply control voltage across a coil 98 of a main interlock control relay which, in turn, closes a normally open relay switch 98a. Upon release of the switch 77a thereafter, control potential will be maintained across relay coil 98 to hold contacts 98a closed. Accordingly, control potential on bus line 88 is applied by the closed stop switch 77b and contacts 98a to secondary bus line 99. This places the control potential on the line 99 through the fuel level switch 97a and switches 79 and 84 to energize motor control relays 82 and 85, respectively. The auger motors 9, 10 and 53 are thus activated to transport fuel from the hopper 2 into the gasification chamber 8 and the venturi fan motor 14 is energized to cause the fan 15 to commence drawing ambient air through the access opening 43 into the chamber 8 and through the panels 32 into the secondary air chamber 31.

The auger 54 draws fuel upwardly from the base of the hopper 2 and discharges the same into auger tube 5 whereupon the auger 7 transports the fuel into the chamber 8 where it is dumped upon the floor 46 around the grate structure 12. Also, upon placement of control potential on the line 99 and across a time delay relay 100, a timing circuit within the relay counts out a preselected time period (30 seconds, for example) at the end of which time a relay coil 101 is energized to close a normally open relay switch 101a and energize a solenoid torch gas valve 103 (See also FIG. 3) to allow propane gas to pass through the gas jet 34. At the same time the coil 101 becomes energized, control potential on the line 99 is applied through switch 101a to the primary coil of a spark ignition transformer 104 to place a 6,000 volt potential upon a spark plug 105 located in the jet 34. The transformer 104 is located within a housing 104a above the panels 32 as shown in FIG. 3. So long as the spark plug 105 is operative and propane gas is flowing through the valve 103 into the chamber 13, a flame rod 106 will detect a gas flame in the chamber 13 and heat up to and beyond a preselected temperature level such as, for example, 200° F. Upon reaching the preselected temperature level, a bimetallic switch 107 associated with the flame rod 106 will open to remove control potential from across a 60 second time delay relay 108 which was placed thereon at the time the line 99 was first energized. Thus, once the spark plug 105 is energized and the gas valve 103 is opened by time delay relay 100, the time delay relay 108 provides an additional 30 seconds time for the flame rod 106 to reach the operating temperature of switch 107 indicative of existence of a flame in the chamber 13 emanating from the torch 34. Should the switch 107 fail to open during this additional 30 second period, indicative of an inoperative condition of the torch 34, the relay 108 will time out to energize a coil 109 and thus open a normally closed relay switch 109a. Opening of the switch 109a will de-energize a previously energized relay coil 111 which, in turn, opens a normally open set of contacts 111a which, in turn, de-energizes the relay coil of the gas valve 103 and the spark plug 105. The timing out and activation of the relay 108 will thus occur when there is a failure of the spark plug 105, a failure of the gas valve 103 or upon interruption of the flow of propane to the valve 103. If prior to the end of the 60 second time out period of the relay 108, the flame rod 106 is detecting a flame from the jet 34 such that the switch 107 is open, the relay 108 will not time out and consequently the spark plug 105 and gas valve 103 will continue to operate until a thermocouple probe 114 detects a preselected minimum operating temperature level in the chamber 13 indicative of combustion of the producer gas. A temperature level of at least 1200° F. will occur whenever the producer gas is burning in the chamber 13. Accordingly, I recommend setting the temperature controller 75 to operate when the temperature in the chamber 13 increases to 1200° F. such that a normally closed relay switch 75a controlled by the controller 75 opens to de-energize the coil 111 and opens the switch 111a to thus close gas valve 103, de-energize the transformer 104 and spark plug 105, and such that a relay coil 116 is de-energized to close a pair of relay contacts 116a, 116b and connect a thermocouple 119 to the controller 76. The thermocouple 119 is employed to measure the temperature of drying air in the region where exhaust gas from the eductor system 3 is directed for heating or drying purposes. For example, the thermocouple 119 might be located in the plenum chamber under the perforated flooring of a grain bin into which the exhaust gas is introduced during grain drying operations. Removal of the thermocouple 119 from the controller 76 causes the temperature indicator in the dial 74 to rapidly rise to full scale indicative of an excessly high drying air temperature in the plenum of the grain bin, whereupon the controller 76 generates a signal on a pair of lines 120, 121 to actuate the damper motor 96 to fully open the door 23 in the eductor system 3 and discharge all of the exhaust gas from the chamber 13 therethrough.

The thermocouple 119 is only disconnected from the temperature controller 76 during the initial start-up period of the furnace 1 during the period of time that the temperature in the combustion chamber 13 as sensed by the probe 114 is less than 1200° F. At temperatures below this level, the flammable products in the producer gas may not be fully burned and converted into clean, non-toxic gases. Under such circumstances, the unburned residue of the producer gas could contaminate grain in a grain bin if these products were permitted to flow therein rather than being diverted to ambient atmosphere through the open door 23. To accomplish such diversion of incompletely burned producer gas during furnace start-up periods, the circuit of FIG. 15 operates to disconnect the thermocouple 119 from controller 76 and thus simulate what appears to the controller 76 to be an excessive overheat condition in the grain bin, although in reality such a condition does not exist.

Upon start-up of the furnace 1 and upon the temperature in the chamber 13 rising to a preselected temperature of 1200° F. as sensed by the thermocouple 114, controller 75 opens the switch 75a thus de-energizing coils 111 and 116.

When the coil 116 becomes de-energized, the contacts 116a and 116b close to re-connect the grain bin thermocouple 119 to the controller 76, the controller 76 thus begins to read the actual temperature of drying air in the grain bin, and the motor 96 operates to close the door 23 and pass exhaust gas from the chamber 13 to the grain bin to commence drying operations. Should the temperature in the chamber 13 exceed a maximum preselected level such as 1650° F., for example, the controller 75 will activate the motor 95 to move the panels 32 toward a more open position to allow more ambient air to enter the secondary air chamber 31 and mix with the burning producer gas in the chamber 13, thereby reducing the temperature in chamber 13 and thus tending to maintain the same at a 1650° F. set point. Conversely, should the temperature in the chamber 13 fall below 1650° F., but not below 1200° F., the controller 75 will activate the motor 95 to move the panels 32 toward a more closed position to reduce the amount of ambient air entering the chamber 31, thus allowing the temperature of burning producer gas in the chamber 13 to increase back to the set point temperature. I use a relatively high set point temperature of 1650° F. to provide additional assurance that all flammable components of the producer gas will be fully burned in the chamber 13.

Returning now to conditions of initial start-up of the furnace 1, the auger motors 9, 10 and 53 operate to supply fuel to the chamber 8 until the level of fuel therein rises to the level of the switch 97a and trips the same to an open position. Upon opening of the switch 97a, voltage on the line 99 is removed from the relay coils 82 and 85 to de-activate auger motors 9 and 53 and terminate removal of fuel from the hopper 2. Upon de-energizing the relay coil 85, a normally open switch 85a previously in a closed position is returned to the open position to immediately energize a time delay relay 123 and begin its countdown. Time delay relay 123, in turn, immediately closes a relay switch 123a thus maintaining control potential from the line 99 on the relay coil 83 to cause the horizontal auger motor 10 to continue running until the countdown time set on relay 123 is completed at which time switch 123a opens to stop the motor 10. It is necessary to continue the operation of the motor 10 and auger 7 for a short time after the incline auger motor 9 is de-activated in order to remove all of the fuel from the auger 7 and deposit the same in the chamber 8 so that fire which normally will develop in the chamber 8 as the furnace 1 cools after shutdown, does not travel out of the chamber 8 along the auger tube 5, thence into the auger tube 4, and, ultimately, into the hopper 2 itself.

Also, when the temperature in the chamber 13 as sensed by the thermocouple 114 and the controller 75 increases to a minimum level indicative of complete combustion of the producer gas (1200° F.), the switch 75a opens to de-energize the coil 116 to also close a switch 116c to apply the voltage upon the line 99 to a ready light 126 located on the panel 72. Thus, the operator is advised that the furnace 1 is producing clean, non-toxic, stable exhaust gas.

Initially, during start-up periods and at any time when the temperature in the chamber 13 is below a safe operating temperature of 1200° F., the coil 111 being energized, maintains a normally closed relay switch 111b in an open condition. For this reason during such periods, the bypass switch 92 must be in a closed position in order to apply control potential to the line 99. Once the operating temperature of 1200° F. is reached, the coil 111 as controlled by the switch 75a is de-energized to thus return the switch 111b to its normally closed position. When this occurs as indicated by the illumination of the ready light 126, the operator should open the switch 92 so that if, during furnace operation, the temperature in the chamber 13 falls below 1200° F. for any reason, the alarm or horn 87 will operate. The alarm 87 will operate under such conditions because, as the temperature in the chamber 13 drops below 1200° F., the controller 75 operates to close the switch 75a thus energizing the coil 116 to open contacts 111b. Upon opening of the contacts 111b, the coil 98 becomes de-energized to close the switch 98b and thus apply control potential on line 99 to the horn 87.

To protect auger motors 9, 10 and 53, conventional overload relay switches 128, 129 and 130 are connected in series between the line 89 and the coil 98 of the main interlock relay and to each of the motors respectively, all in the usual well known manner. Thus, an overload condition on any one or more of the motors 9, 10 and 53 will open the corresponding switches 128-130 to shut down the furnace 1 except that the venturi motor 14 will continue to be operative. Overload lamps 131, 132 and 133 will glow whenever their corresponding overload switches 128-130 open. A neon lamp 134 will glow whenever both switches 92 and 111b are open during start-up conditions thus indicating that, while the temperature in the chamber 13 is less than 1200° F., the manual override switch 92 is open and should be closed. If the switch 92 is not maintained closed during such start-up conditions, the circuit of FIG. 15 will not be operative since coil 98 will not be energized.

The venturi fan motor 14 is also provided with conventional overload protection which, when operative, opens a normally closed switch 135 series connected between the line 89 and the venturi fan relay 81 to thus disable the motor 14. A neon light 136 located on the panel 72 and connected across the switch 135 will glow to indicate an overload condition on the venturi fan motor.

An alarm light 137 connected across the series combination of the switch 86 and alarm 87 glows even after the alarm switch 86 is opened to silence the alarm 87 and remains illuminated until the fault that activated the alarm 87 is corrected. A lamp 138 across the horizontal auger relay coil 83 glows whenever the coil 83 is energized to indicate that the auger 7 is operating. Since the auger 7 will not be viewable by the operator during operation of the furnace 1, the lamp 138 provides the only means of confirming its actual operations.

To complete the present example, the following table identifies electrical components which are suitable for use in the control circuit of FIG. 15.

| | |
|---|---|
| Temperature controller 75 | Partlow Model #76BF-4003-206-20-AD; 0–2500° F. |
| Temperature controller 76 | Partlow Model #76BF-4003-111-20-AD; 0–300° F. |
| Motors 95, 96 with associated control circuits 93, 94, respectively | Honeywell Modutrol Motors, Model #M744A1006 |
| Temperature sensing probe 114 | Pyro Mation Thermocouple Probe, Model #K16H-12-HI |
| Temperature sensing probe 119 | Honeywell Model #2J4 M15-G18-12 |
| Transformer 104 | Jefferson Model #638-181 |
| Time delay relay 100 | Amperite 30 Sec. delay relay, Model #115C30 |
| Time delay relay 108 | Amperite 60 Sec. delay relay, Model #115C60 |
| Time delay relay 123 | Time Mark 0–60 Sec. adjustable DPDT release relay, Model #331 |
| Gas valve 103 | Honeywell solenoid gas valve, Model #V4036A1001 |
| Motor relays 81–83 and 85 | Rowan Contactor, Model #2200EB 330 |
| Control relays 98, 111, 116 | Potter & Brumfield, Model #DAP14AG |
| Main Start/Stop Switches 77a, b | Micro Switch Model #PTY-4223G-B21 |
| Venturi motor switch 78 and mixer and horizontal auger switches 79–80, respectively | Cutler-Hammer, Model #10250T1325 |
| Incline auger switch 84 | Cutler-Hammer Model #10250T3033 |
| Switches 92 and 86 | SPST toggle, McGill, Model #90-0003 |
| Fuel level switch 97a | Square D limit switch, Class 9007, Type B54-J |
| 120 volt lamps 137, 138 and 126 | Sylvania No. 7C7 |
| 120 volt neon lamps 132, 133, 134 and 136 | Chicago Miniature Lamp, Model #41H(B2A) |
| Flame rod 106 | Farm Fans, Model #26-009 |

Referring lastly to FIGS. 12–13, it will be observed that the downstream ends of the duct 62 and the plenum chamber 58 form spaced rectangular openings of approximately the same shape and area and are disposed in registry with one another, whereby the jet 68 lies between the downstream end of the duct 62 and the downstream end of the plenum chamber 58.

Although the present invention has been described with respect to specific details of certain preferred embodiments thereof, it is not intended that such details limit the scope of the present invention otherwise than as set forth in the following claims.

I claim:

1. In an improved biomass gasifier combustor system of the type which conventionally includes a gasification chamber for burning a biomass fuel therein to form a volatile producer gas; primary air inlet means connected to said gasification chamber for introducing primary ambient air into said gasification chamber sufficient to permit combustion of said fuel in a limited combustion zone; a gas combustion chamber communicating with said gasification chamber for receiving said producer gas therein; secondary air inlet means connected to said combustion chamber for introducing secondary ambient air into said combustion chamber for mixing with said producer gas sufficient to permit combustion of said producer gas; and suction means connected to an exhaust port of said combustion chamber for drawing a gaseous combustion product of the mixture of said producer gas and air from said combustion chamber and for directing said product toward a remote location for use as a heating or drying medium and for drawing said producer gas from said gasification chamber into said combustion chamber, the improvement of which comprises:

a furnace assembly defining a principal hollow chamber therein;

a housing, separate and distinct from said furnace assembly defining a secondary air chamber therein and being disposed in a central portion of said principal chamber to form a partition between two regions of said principal chamber, which regions define said gasification and combustion chambers communicating with one another through a first port located between said secondary air chamber and a defining surface of said principal chamber, said housing further defining a second port therein which communicates between said secondary air and combustion chambers, and means for introducing a quantity of secondary ambient air into said secondary air chamber.

2. The system of claim 1 wherein said defining surface of said principal chamber is a ceiling thereof.

3. The system of claim 1 wherein said first port is located between a ceiling of said principal chamber and an upper surface of said housing.

4. The system of claim 1 wherein said second port is located in an upper end portion of said housing under said first port.

5. The system of claim 1 wherein said secondary air chamber extends across said principal chamber between opposite defining side walls thereof.

6. The system of claim 1 wherein said secondary air introducing means comprises a third port containing a series of adjustable panels adapted for adjusting the quantity of ambient air introduced into said secondary air chamber per unit of time.

7. The system of claim 1 further comprising air divider means disposed in said secondary air chamber for improving the uniformity of distribution of ambient air flow through said second port to more efficiently mix secondary ambient air with said producer gas in said combustion chamber.

8. The system of claim 7 wherein said air divider means comprises a flat plate.

9. The system of claim 8 wherein said flat plate extends approximately one-half of the total distance across said secondary air chamber from said secondary air introducing means, said plate being spaced above a floor of said secondary air chamber a distance sufficient to divide ambient air flowing through said introducing means into two streams, one of which streams flows over and one of which streams flows under said plate.

10. The system of claim 1 wherein said suction means comprises the improvement of a venturi eductor assembly which includes
   a suction duct having a rectangular cross-section connected at one end thereof to said exhaust port,
   a second housing forming a plenum chamber, said duct extending into said plenum chamber, one end of said housing being closed around said duct next to said exhaust port,
   air passage means connected on one end thereof to one side of said second housing and communicating with said plenum chamber,
   a blower fan connected to the other end of said air passage means for directing air toward a side of said duct,
   divider panel means disposed in said air passage means for dividing the flow of air generated by said fan into two streams, one of which flows over and the other of which flows under said duct, an end portion of said second housing being tapered inwardly toward the other end of said duct to form an exhaust jet which follows a rectangularly shaped path between and about the downstream ends of said duct and second housing,
   a throat member connected to the other end of said second housing in which fan air exhausted through said jet mixes with a gas exhausted through said duct.

11. The system of claim 10 wherein said downstream ends of said duct and second housing and said jet lie in a single plane.

12. The system of claim 10 wherein the other end of said second housing lies downstream of the downstream end of said duct and forms a rectangularly shaped opening approximately identical in shape and size to the opening in the downstream end of said duct, said openings being spaced from and in registry with one another.

13. The system of claim 1 further comprising a door hingably connected to a discharge section of said suction means and adapted to close an opening defined by one surface of said section, said door being adapted to open by tilting into a gas passageway in said section into interferring relation with the flow of said gaseous combustion product toward said remote location, whereby said product is at least partially diverted from said passageway to ambient atmosphere outside of said suction means.

14. The system of claim 13 further comprising
   first means for sensing the temperature at said remote location,
   means for comparing said remote location temperature with a predetermined set-point temperature, and
   means responsive to a difference between said remote location and set-point temperatures and operatively associated with said door for adjusting the amount of said product diverted from said passageway to at least partially eliminate said difference.

15. The system of claim 14 wherein said comparing means comprises a temperature controller, said adjusting means comprising a modulating motor operatively connected to said door and responsively connected to said temperature controller.

16. The system of claim 15 further comprising
   second means for sensing the temperature in said combustion chamber, and
   means responsively connected to said second temperature sensing means for disconnecting said first temperature sensing means from said temperature controller when the temperature in said combustion chamber is less than a preselected value, thereby simulating an excessive high temperature at said remote location as sensed by said controller; and
   means responsively connected to said controller for activating said motor to open said door into said passageway to fully divert said product away from said remote location to ambient atmosphere.

17. The system of claim 1 further comprising
   biomass fuel storage means,
   first and second screw feeder means connected to one another between said gasification chamber and storage means for transporting a quantity of biomass fuel from said storage means through said first feeder means and thence through said second feeder means into said gasification chamber,
   means for activating said first and second feeder means, and
   means for de-activating said first feeder means prior to de-activation of said second feeder means to permit said second feeder means to empty itself of all of the biomass fuel which is present therein when said first feeder means is de-activated, thereby to prevent a fire burning in said gasification chamber from spreading to a fuel which would otherwise be present in said second feeder means, thence into a fuel located in said first feeder means and thence into a fuel located in said storage means.

18. The system of claim 17 wherein said first feeder means is vertically inclined between a base portion of said storage means and one end of said second feeder means, said second feeder means being disposed in a horizontal plane and connected to an upper portion of said gasification chamber.

19. The system of claim 17 further comprising anti-bridging means connected to said storage means for preventing a biomass fuel located in said storage means from bridging across a receiving end portion of said first feeder means so as to prevent said first feeder means from engaging and transporting said fuel out of said storage means.

20. The system of claim 19 wherein said anti-bridging means comprises an auger projecting into said storage means parallel with and above said receiving end portion of said first feeder means.

21. The system of claim 1 further comprising
   means for sensing the temperature in said combustion chamber,
   means connected to said temperature sensing means for comparing the temperature in said combustion chamber with a preselected standard operating temperature, and
   means operatively connected to said secondary air inlet means and responsively connected to said comparing means for adjusting the quantity of ambient air introduced into said combustion chamber to at least limit a difference between said conbustion chamber temperature and said standard operating temperature.

22. The system of claim 21 wherein said comparing neans comprises a temperature controller and said adjusting means comprises
an adjustable air inlet port communicating with said secondary air inlet means, and
a motor operatively connected to said adjustable air inlet port and responsively connected to said temperature controller.

23. In the system of claim 1 which further conventionally includes screw feeder means connected between a remote source of biomass fuel and an upper end portion of said gasification chamber, means for controlling the maximum level to which a biomass fuel is deposited in said gasification chamber comprising
a fuel level actuating lever pivotally mounted on an upper end portion of a vertical interior wall of said gasification chamber such that a lower end of said lever is approximately at the same level as an end portion of said feeder means which projects within said gasification chamber, said lever being inclined downwardly and away from said end portion when the level of said fuel in said gasification chamber is below said end portion,
a switch located outside of said gasification chamber having a switch arm connected to said lever, said lever being pivotal in a vertical plane through a selected angle to move said switch arm and open said switch, and
means responsively connected to said switch for de-activating said feeder means upon movement of said lever through said angle to open said switch.

24. In a biomass gasifier combustor system of the type which conventionally includes a gasification chamber for burning a biomass fuel therein to form a volatile producer gas, primary air inlet means communicating with said gasification chamber, a gas combustion chamber communicating with said gasification chamber, secondary air inlet means communicating with said combustion chamber, and suction means communicating with said combustion chamber for drawing a gaseous combustion product from said combustion chamber and directing said product toward a remote location for use as a heating or drying medium and for drawing said producer gas from said gasification chamber into said combustion chamber, means for controlling the operation of said system comprising
first means for sensing the temperature at said remote location,
second means connected to said first temperature sensing means for comparing the temperature of said remote location with a preselected maximum temperature, and
adjustable gas diverting means connected to a discharge end portion of said suction means for diverting said gaseous combustion product, upon command, from said remote location to ambient atmosphere, and
driving means responsively connected to said second means and operatively connected to said diverting means for diverting said product from said remote location to ambient atmosphere when the temperature of said remote location is greater than said preselected maximum temperature.

25. The system of claim 24 wherein said controlling means further comprises
second means for sensing the temperature in said combustion chamber,
second means responsively connected to said second temperature sensing means for comparing the temperature in said conbustion chamber with a preselected minimum operating temperature, and
means operatively connected to said driving means and responsively connected to said second comparing means for diverting said product from said remote location to ambient atmosphere during system start-up conditions so long as the temperature in said combustion chamber is less than said preselected minimum temperature.

26. The system of claim 25 wherein said preselected minimum temperature is approximately 1200? F.

27. The system of claim 25 further comprising automatic feeder means for feeding a biomass fuel from a remote source into said gasification chamber, and
means responsively connected to said second comparing means for de-activating said feeder means after the temperature in said combustion chamber has first increased to said minimum operating temperature and thereafter fallen below said minimum operating temperature so as to shut down the operation of said system.

* * * * *